United States Patent [19]

Wilhelm

[11] 4,118,207

[45] Oct. 3, 1978

[54] ROTATING DISC PARTICULATE SEPARATOR

[75] Inventor: Thomas K. Wilhelm, Cedar Falls, Iowa

[73] Assignee: United States Steel Corporation, Pittsburg, Pa.

[21] Appl. No.: 747,879

[22] Filed: Dec. 6, 1976

[51] Int. Cl.² ............................................. B01D 45/00
[52] U.S. Cl. .................................... 55/338; 55/345; 55/403; 55/406
[58] Field of Search ................................ 55/338–340, 55/282, 403, 406–409, 459 R, 345

[56] References Cited

U.S. PATENT DOCUMENTS

| | | | |
|---|---|---|---|
| 2,269,412 | 1/1942 | Sturkvant | 55/406 |
| 2,478,466 | 8/1949 | Dohrer | 55/408 |
| 2,569,567 | 10/1951 | Korn | 55/408 |
| 2,738,855 | 3/1956 | Fallon et al. | 55/338 |

FOREIGN PATENT DOCUMENTS

| | | | |
|---|---|---|---|
| 620,108 | 1/1927 | France | 55/401 |
| 272,288 | 12/1912 | Fed. Rep. of Germany | 55/409 |
| 322,810 | 12/1929 | United Kingdom | 55/338 |

Primary Examiner—Bernard Nozick
Attorney, Agent, or Firm—Zarley, McKee, Thomte, Voorhees & Sease

[57] ABSTRACT

A separator of particulate material from fluid or gas or fluid mixture systems comprising a separator housing having intake and discharge openings formed therein. The intake opening of the separator housing is in communication with the medium in which the particulate material is suspended. The discharge opening of the separator chamber is in communication with a cyclone type settling chamber. A by-pass line extends from the upper end of the settling chamber to the conduit which is supplying the medium to the separator housing. A plurality of closely spaced hollow discs are rotatably mounted within the separator housing and are rotated by means of an electric motor or the like. A fan apparatus is in communication with the interior of the separator housing and is adapted to draw the medium from the intake opening, thence through the space between the discs, then longitudinally through the center of the discs to a point of discharge. The particulate material in the medium is suspended in the separator housing adajcent the peripheries of the rotating discs and is supplied to the cyclone type settling chamber.

5 Claims, 6 Drawing Figures

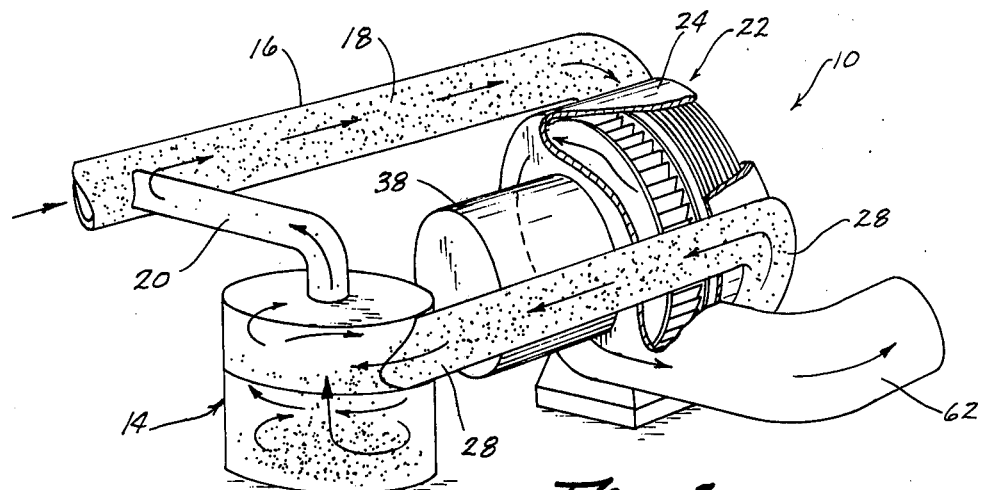
Fig. 1
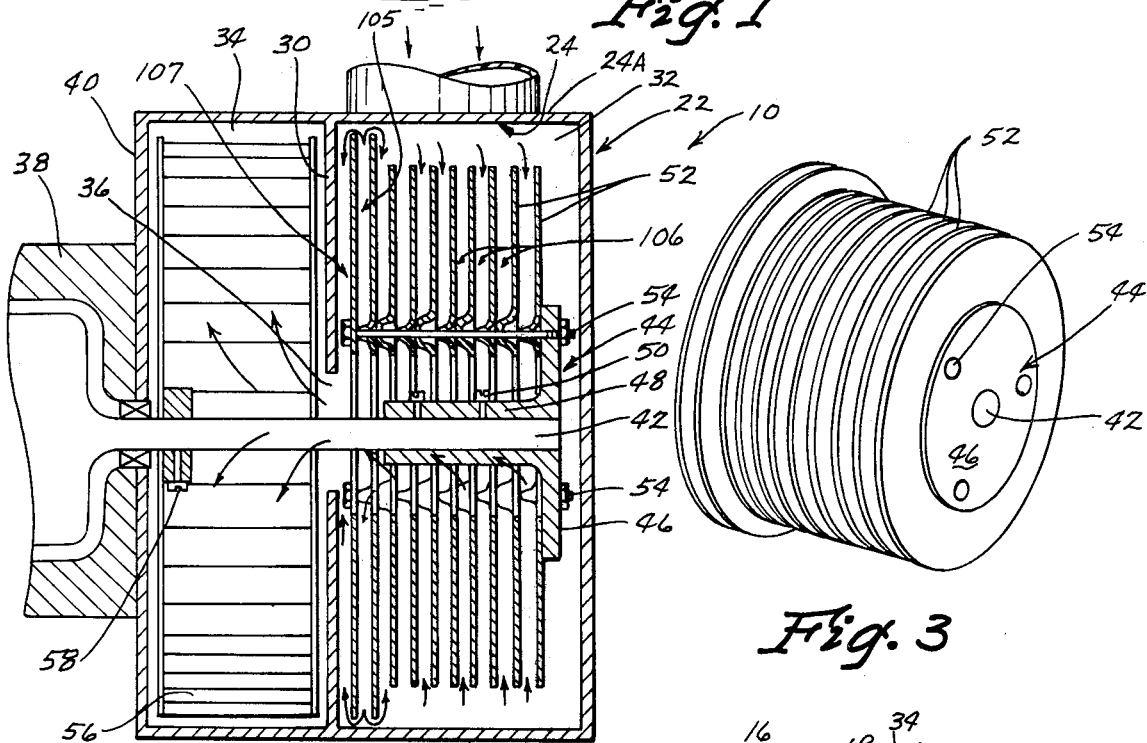
Fig. 2
Fig. 3
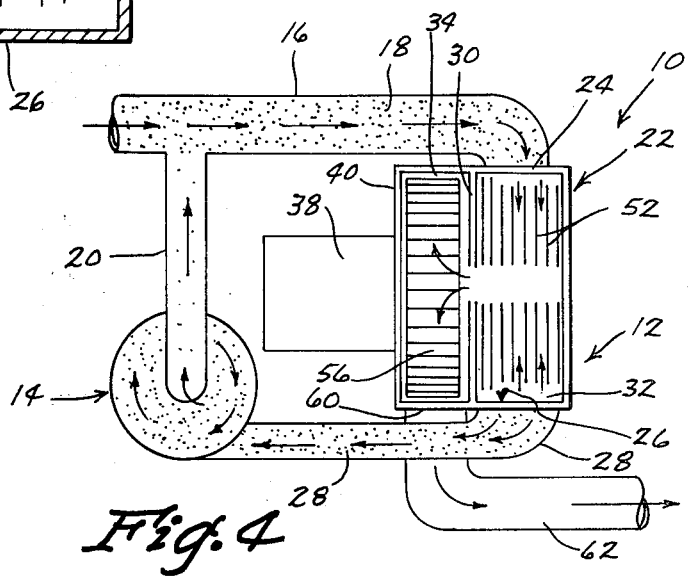
Fig. 4

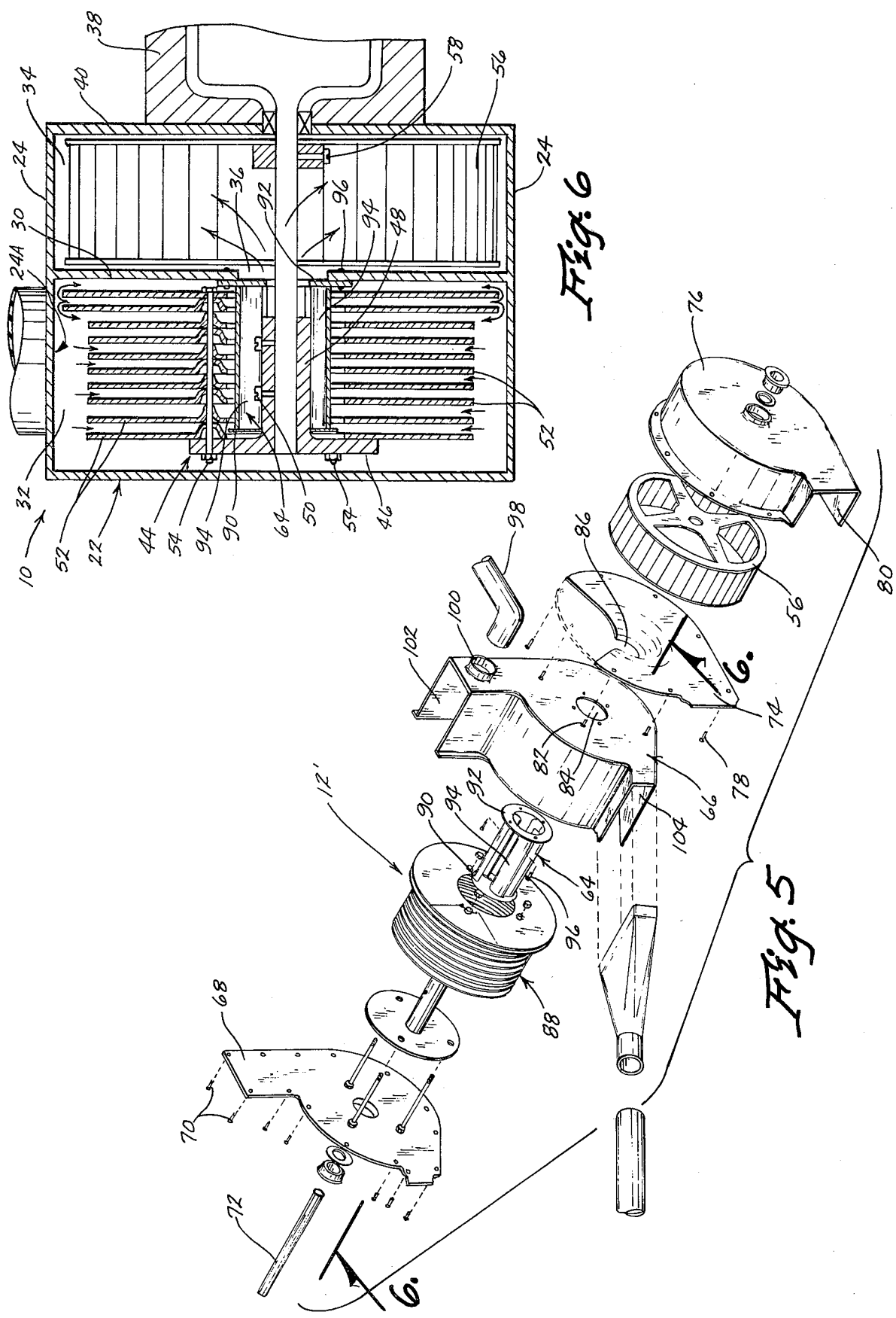

ROTATING DISC PARTICULATE SEPARATOR

BACKGROUND OF THE INVENTION

This invention relates to a separator of particulate material from fluid or gas systems, fluid or gas mixtures, classification of two or more particulates of varying densities in a fluid or gas, and classification of two or more fluids or gases of varying densities.

Many types of separators or filters have been devised in an attempt to remove particulate material from fluid or gas systems. One such example is the type of filters which are employed in clothes dryers used in laundry facilities. The air being discharged from the dryers contains a large amount of lint. If the lint is not collected or trapped, the lint either collects in the duct work or is discharged into the atmosphere. If the lint is collected by means of a filter or the like, a problem is encountered in that the filter becomes quickly clogged or plugged and seriously affects the efficiency of the dryer. A still further problem associated with the conventional dryer filters is that the collected lint becomes a fire hazard.

Therefore, it is a principal object of the invention to provide an improved particulate separator.

A still further object of the invention is to provide a separator which separates particulate material from any type of fluid or gas.

A still further object of the invention is to provide a separator which separates any type of particulate material from a medium.

A still further object of the invention is to provide a particulate separator wherein the flow therethrough is continuous.

A still further object of the invention is to provide a separator which separates particulate material from fluid or gas systems of varying densities.

A still further object of the invention is to provide a separator which classifies two or more fluids or gases in a mixture of varying densities.

A still further object of the invention is to provide a separator which classifies two or more particulates of varying densities in a fluid or gas.

A still further object of the invention is to provide a particulate separator which is economical to manufacture and durable in use.

BRIEF DESCRIPTION OF THE DRAWINGS

FIG. 1 is a schematic type perspective view of the invention with portions thereof cut away to more fully illustrate the invention;

FIG. 2 is an enlarged sectional view through the separator housing and components therein;

FIG. 3 is a perspective view of the separator assembly;

FIG. 4 is a top schematic view of the invention;

FIG. 5 is an exploded perspective view of a modified form of the separator; and

FIG. 6 is a sectional view as seen on lines 6—6 of FIG. 5.

SUMMARY OF THE INVENTION

An apparatus is disclosed for separating particulate material from fluid or gas systems. The apparatus generally comprises a separator assembly adapted to separate the particulate material from the medium having the particulate material suspended therein and to separate the more dense component of a fluid or gas mixture and to supply the same to a cyclone type settling chamber. The separator assembly comprises a separator housing having a separating chamber in communication with the intake opening. A plurality of closely spaced hollow discs are rotatably mounted in the separating chamber. A blower means is in communication with the separating chamber and is adapted to draw the medium from the intake opening, thence through the space between the discs, thence longitudinally through the discs to a point of discharge. The particulate material is separated from the material adjacent the peripheries of the rotating discs and is supplied to the settling chamber. The lighter weight medium passes outwardly from the point of discharge to the atmosphere or the like.

DESCRIPTION OF THE PREFERRED EMBODIMENT

With respect to FIGS. 1-4, the apparatus of this invention is referred to generally by the reference numeral 10 and generally comprises a separator assembly 12 and a settling chamber assembly 14. The numeral 16 refers to a conduit or the like which is in communication with the medium in which the particulate material 18 is suspended. As seen in FIG. 1, a by-pass conduit 20 connects the upper end of the settling chamber assembly 14 to the conduit 16. Settling chamber assembly 14 is of the conventional cyclone type and will not be described in detail.

Separator assembly 12 comprises a separator housing 22 having a circular sidewall 24A, and an intake opening 24 which is in communication with the conduit 16. Housing 22 is also provided with a discharge opening 26 (FIG. 4) formed therein which is in communication with conduit 28 which extends to the settling chamber assembly 14.

As seen in FIG. 2, housing 22 includes an inwardly extending wall 30 which defines a separation chamber 32, and a fan chamber 34. As seen in FIG. 2, wall 30 is provided with a centrally disposed opening 36 formed therein to provide communication between the chambers 32 and 34. Motor 38 is operatively secured to wall 40 of housing 22 and has a power shaft 42 extending inwardly through chambers 34 and 32. It should be noted that motor 38 does not have to be secured to housing 22 but could be supported on a separate stand or the like. Additionally, shaft 42 could be a separate shaft rotatably mounted within housing 22 which is operatively connected to the motor 38 by means of sheaves, drive belts, etc. A separator disc hub assembly 44 is operatively mounted on the shaft 42 and includes a separator disc hub portion 46 and separator disc tube portion 48. Tube 48 embraces shaft 42 and is secured thereto by means of cap screws 50 or the like. A plurality of closely spaced hollow discs 52 are mounted on the separator discs hub assembly 44 by means of a plurality of tie bolts 54 extending therethrough as illustrated in FIG. 2. As seen in FIG. 2, the two or more innermost discs 52 have a diameter larger than the other discs 52 so as to effectively provide a "backflush seal." As a result of the larger diameter of the two or more innermost discs, the pressure potential for flow radially between the large discs is different than the pressure potential for radial flow between the small discs. In the space or spaces 105, the flow is radially outward and in spaces 106, the flow is radially inward. The innermost space 107 between the innermost disc 52 and housing wall 30 has a different radial flow potential than spaces 105 or 106. The stationary housing wall 30 disrupts the rotation of the air in space 107 causing the centrifugal force field to deteriorate in space 107. The flow in 107 is radially inward. Since the centrifugal force field is deteriorated in space 107, the separating capabilities are poor. This would allow particulate and materials otherwise intended for duct 28 to pass radially inward through space 107 into the blower housing and eventually to duct 62, significantly reducing the efficiency of the system. However, the fluid or gas passing radially outward in spaces 105 has already passed radially inward through spaces 106 and is therefore already clarified or otherwise tended for duct 62. The flow passing radially outward through spaces 105 is in sufficient quantity to at least satisfy the radially inward flow in space 107. Therefore, the fluid or gas satisfying the radially inward flow in space 107 has already been prepared for duct 62 by spaces 106 and duct 62 is not contaminated by materials intended for duct 28.

The discs 52 are spaced by forming (embossing) an oblong offset 54 at each of the three mounting holes formed in the discs 52. The offset 54 is formed in a radial and tangential position on alternate discs to prevent nesting. Blower 56 is mounted on shaft 42 in chamber 34 by means of cap screw 58. Housing 40 is provided with a blower discharge opening 60 which is in communication with a discharge conduit 62 which would normally be vented to the atmosphere.

In operation, the medium containing the particulate material would be supplied to the separator assembly 12 by means of the conduit 16. Motor 38 is activated which causes rotation of the blower 56 and discs 52. As the medium enters the housing 22 through the opening 24, the medium is drawn inwardly towards the center of the housing 22 between the discs 52 by the blower 56 but the particles of particulate material are suspended at the outer peripheries of the discs 52 because of the centrifugal force field created by the spinning or rotating discs 52. The pressure at opening 26 is greater then the pressure at opening 24 so that the particles are moved through the conduit 28 to the settling chamber assembly 14. The lighter weight medium moves inwardly between the discs 52 as previously stated, thence through the central openings of the discs 52, through opening 36, through blower 56, through opening 60 and into conduit 62. The particulate material is collected in the settling chamber assembly 14 and the medium is returned to the conduit 16 by means of the by-pass line 20. It should be noted that the larger diameter of the two or more inwardly positioned discs 52 is quite important since they create the previously described seal effect that prevents the particulate material or material otherwise intended for duct 28 from moving directly to the blower 56. The cooperation of the rotating discs 52 and the blower 56 permits the particulate material to be removed from the medium with a great amount of efficiency. The unit will work equally as well in different mediums such as gas or fluids. For example, the system will remove dust from air, particles from fluid and separate fluid and gas mixtures of varying densities. Thus, it can be seen that the embodiment of FIGS. 1–4 accomplishes at least all of the stated objectives.

Referring now to FIGS. 5 and 6, the numeral 12' refers generally to a modified form of the separator assembly. The separator assembly 12' operates in substantially identical fashion to the separator assembly 12 except that the configuration of the separator housing is somewhat different in separator assembly 12' and that a diffuser assembly 64 is employed which improves the air flow efficiency. As seen in FIGS. 5 and 6, separator assembly 12' includes a separator housing 66 having a housing cover 68 secured thereto by screws 70. Blower housing cover 74 is secured to blower housing 76 by screws 78 to define a discharge opening 80. Blower housing cover 74 is secured to separator housing 66 by screws 82. Shaft 72 is rotatably mounted in the separator assembly and is operatively connected to an electric motor or the like which is not shown. Blower 56 is mounted on shaft 72 within blower housing 76 by any convenient means whereby actuation of the blower 56 causes air to be drawn from the interior of the separator housing 66 outwardly through the opening 84, opening 86 and into the interior of blower housing 76 and thence outwardly through the opening 80. Separator disc assembly 88 is mounted on shaft 72 for rotation therewith as in the embodiment of FIGS. 1–4. Diffuser assembly 64 includes a small diffuser end 90, large diffuser end 92 and a plurality of diffuser blades 94 extending therebetween. Diffuser assembly 64 is secured to separator housing 66 by means of screws 96. Return air tube 98 is in communication with opening 100 formed in separator housing 66 and is in communication with the settling chamber assembly. Housing 66 is provided with an intake opening 102 and a discharge opening 104. Intake opening 102 is in communication with a conduit such as conduit 16 illustrated in FIGS. 1 and 4. Likewise, opening 104 is in communication with a conduit such as conduit 28 in FIGS. 1 and 4.

The embodiment of FIGS. 5 and 6 functions in the identical manner as the embodiment of FIGS. 1–4 except that the diffuser assembly 64 increases the efficiency of the air flow through the device. Diffuser assembly 64 remains stationary relative to the rotating discs 88 so that the air or medium is more efficiently drawn between the discs 88 and outwardly through the blower 82. Thus, it can be seen that the embodiment of FIGS. 5 and 6 also accomplishes at least all of the stated objectives.

I claim:
1. A separator for separating particulate material from fluid or gas systems comprising, intake means adapted to be in communication with a medium in which a particular material is suspended;

a separating chamber having a housing including a circular sidewall and an inner end wall, said housing having an intake opening in communication with said intake means and a discharge opening;

said inner end wall having an opening therein providing communication between the interior and exterior of said chamber;

a plurality of first discs and at least two second discs axially aligned in close spaced relationship within said separating chamber;

said second discs being located between said first disc and said inner end wall and in close spaced relationship to said inner end wall;

said first and second discs having hollow portions adjacent the centers thereof;

means for supporting and rotating said first and second discs within said chamber;

said first discs being of substantially the same size;

said second discs being of substantially the same size and being larger than said first discs, the peripheries of said second discs being closely adjacent and spaced from said circular wall of said housing so as to provide a backflush seal between the outer periphery of said second discs and said circular wall during rotation of said discs;

fan means in communication with said separating chamber through said opening in said inner end wall for drawing said medium from said intake means thence radially through the spaces between said first discs, thence axially through the hollow portions of said first and second discs and through said opening in said inner end wall, whereupon rotation of said first and second discs causes a radially inward pressure flow in the spaces between said first discs and a radially outward pressure flow in the spaces between said second discs, the rotation of said first and second discs causing the particulate material in said medium to move adjacent the peripheries of said first and second discs; and particulate collector means in communication with said separating chamber through said discharge opening adjacent the peripheries of said first and second discs and adapted to receive a portion of the medium therein along with particulate materials suspended in said separator chamber adjacent the peripheries of said first and second discs.

2. The device of claim 1 wherein a by-pass conduit connects said collector means and said intake means so that a portion of said medium containing particulate material not collected within said collector means can be recycled through said separating chamber.

3. The device of claim 1 wherein said fan means is adapted to draw said medium radially inwardly through an innermost space between said inner wall and said innermost discs, the radially outward flow between said innermost discs being at least sufficient to satisfy the radially inward flow through said innermost space.

4. The device of claim 1 wherein said fan means is adapted to draw said medium radially inwardly through the space between the other of said discs and through an innermost space between said inner wall and the innermost discs, said innermost discs being adapted to cause a radially outward flow of said medium through the space between said innermost discs.

5. A separator for separating particulate material from fluid or gas systems comprising:

an intake means adapted to be in communication with a medium in which particulate material is suspended;

a separating chamber in communication with said intake means, said separating chamber having a circular cross-section;

a plurality of closely spaced hollow discs axially aligned in said separating chamber;

means for supporting and rotating said discs;

fan means in communication with said separating chamber and adapted to draw said medium from said intake means, thence through the space between said discs, thence longitudinally through said discs to a point of discharge;

a particulate collector means in communication with said separating chamber adjacent the peripheries of said discs and adapted to receive a portion of said medium therein, along with particulate materials suspended in said separator chamber adjacent the peripheries of said disc, at least two adjacent discs having a larger diameter than the other of said discs; and a diffuser assembly extending through the center portions of said discs, said diffuser assembly comprising a plurality of spaced apart and longitudinally extending blades.

* * * * *